United States Patent
Cotte et al.

(10) Patent No.: US 11,270,247 B2
(45) Date of Patent: Mar. 8, 2022

(54) SYSTEM FOR ROUTING ARTICLES BY INDIVIDUALS WHO ARE MEMBERS OF A COMMUNITY, CARRYING OUT A CONTROL OF THE CONTENTS BY IMAGING DURING TRANSFER OF THE PACKAGE BETWEEN INDIVIDUALS

(71) Applicant: PA. COTTE SA, Pully (CH)

(72) Inventors: Pierre-Alain Cotte, Amberg (DE); Laurent Gaussin, Suce sur Erdre (FR)

(73) Assignee: PA. COTTE SA, Pully (CH)

( * ) Notice: Subject to any disclaimer, the term of this patent is extended or adjusted under 35 U.S.C. 154(b) by 214 days.

(21) Appl. No.: 16/342,570

(22) PCT Filed: Oct. 12, 2017

(86) PCT No.: PCT/EP2017/076132
§ 371 (c)(1),
(2) Date: Apr. 17, 2019

(87) PCT Pub. No.: WO2018/073104
PCT Pub. Date: Apr. 26, 2018

(65) Prior Publication Data
US 2020/0051014 A1 Feb. 13, 2020

(30) Foreign Application Priority Data
Oct. 19, 2016 (FR) ...................................... 1660148

(51) Int. Cl.
*G08B 13/12* (2006.01)
*G06Q 10/08* (2012.01)
(Continued)

(52) U.S. Cl.
CPC ..... *G06Q 10/0833* (2013.01); *G06K 7/10722* (2013.01); *G06K 7/10881* (2013.01);
(Continued)

(58) Field of Classification Search
CPC ... G08B 13/126; G06Q 50/28; G06Q 10/0833
(Continued)

(56) References Cited

U.S. PATENT DOCUMENTS 10,853,757 B1 * 12/2020 Hill .................... G06K 9/00771
2007/0124020 A1   5/2007 Staples
(Continued)

FOREIGN PATENT DOCUMENTS

JP          2011502912          1/2011

OTHER PUBLICATIONS

English translation of the International Preliminary Report on Patentability (Chapter I) issued by the International Bureau, dated Apr. 23, 2019, for International Patent Application No. PCT/EP2017/076132; 8 pages.
(Continued)

*Primary Examiner* — Toan C Ly
(74) *Attorney, Agent, or Firm* — Faegre Drinker Biddle & Reath LLP

(57) ABSTRACT

The invention concerns a system for dispatching objects via individuals of a community using packages intended to contain the objects and given at least one recognition code, a computing platform including at least one computing application intended to be downloaded by the computing units held by the individuals of the community, and each package is provided with at least one image sensor for said object(s), and the system includes a module to determine and detect a predetermined key step in the dispatching of the package, and the computing platform and/or the computing units are parameterized to transmit an image capture request to the image sensor(s) at each predetermined key step of dispatch; and receive images, via the computing application, relating to said object(s) taken by the image sensor(s).

12 Claims, 4 Drawing Sheets

Figure 1:
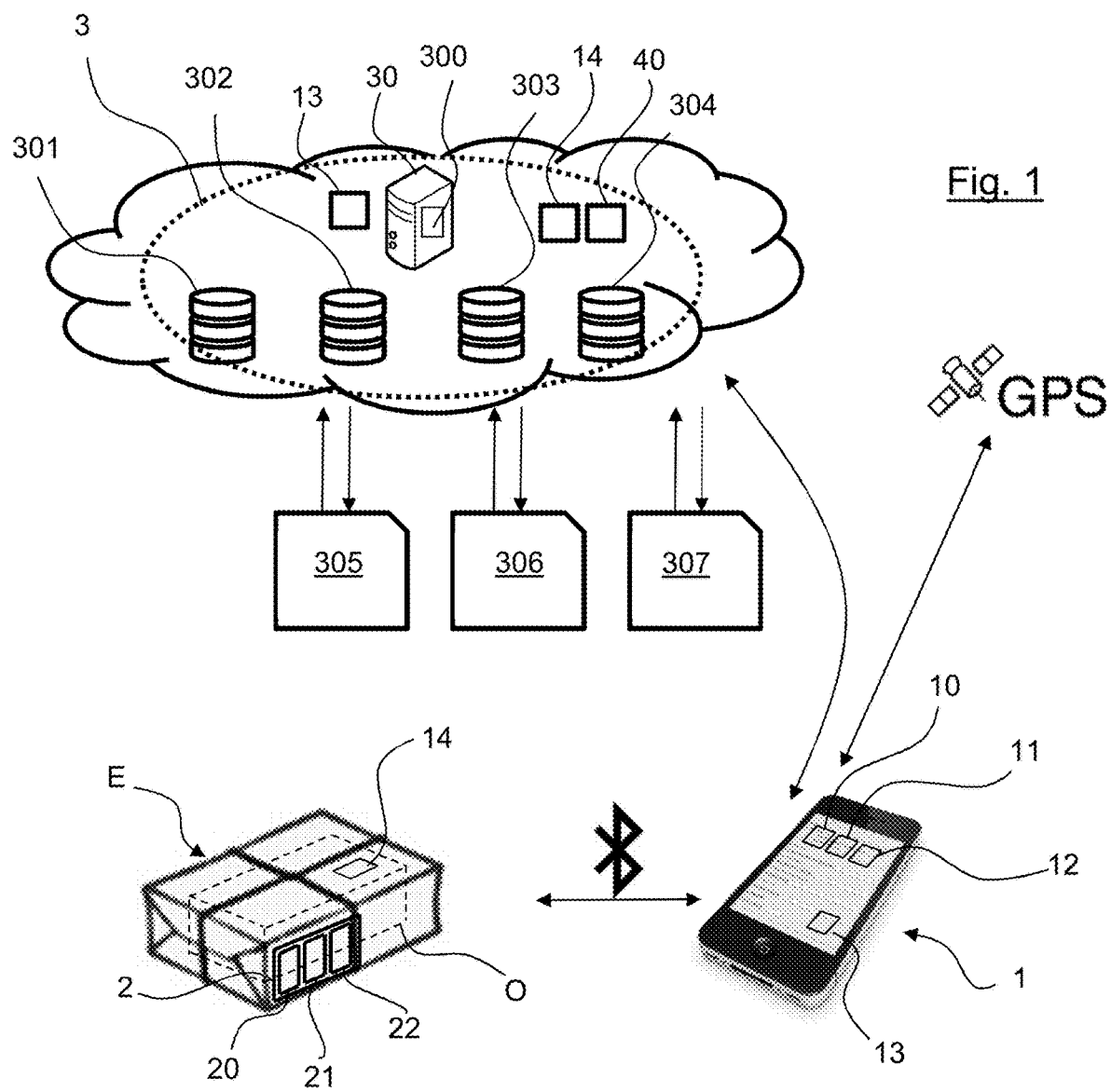

(51) Int. Cl.
 *G06Q 50/28* (2012.01)
 *G06K 7/10* (2006.01)
(52) U.S. Cl.
 CPC ........... *G06Q 50/28* (2013.01); *G08B 13/126* (2013.01); *G06K 2007/10524* (2013.01)
(58) Field of Classification Search
 USPC ......................................... 705/333; 235/375
 See application file for complete search history.

(56) References Cited

U.S. PATENT DOCUMENTS

2011/0175727 A1    7/2011   Aikaterinidis
2014/0279596 A1    9/2014   Waris

OTHER PUBLICATIONS

International Search Report and Written Opinion of the European Patent Office, dated Dec. 15, 2017, for International Patent Application No. PCT/EP2017/076132; 16 pages.

\* cited by examiner

SYSTEM FOR ROUTING ARTICLES BY INDIVIDUALS WHO ARE MEMBERS OF A COMMUNITY, CARRYING OUT A CONTROL OF THE CONTENTS BY IMAGING DURING TRANSFER OF THE PACKAGE BETWEEN INDIVIDUALS

CROSS-REFERENCE TO RELATED APPLICATIONS

The present application is a national stage entry of International (PCT) Patent Application Number PCT/EP2017/076132, filed Oct. 12, 2017, which in turn claims priority to French Patent Application No. 1660148, filed Oct. 19, 2016, the subject matter of which are expressly incorporated herein by reference.

The field of the invention pertains to logistics. More specifically, the invention concerns the dispatching of objects and more particularly objects of size and weight allowing the conveying thereof by any person and by any or nearly any means.

In this respect, the invention concerns a system for dispatching objects not weighing more than 8 kg, or more generally of size and weight corresponding to the definition of hand luggage for airline companies. Evidently, the invention also applies to objects of smaller size/weight, possibly including the sending of mere envelopes.

In the field of the invention, some service providers of online purchase and sale of products have generated considerable expectations in terms of the delivery of said products worldwide.

However, on international scale, express deliveries within a few hours are complicated and even impossible, and at the very least are very slow and/or most costly. There are therefore strong limiting factors for international trade and private deliveries, at a time when trade via the internet has no borders. As a result, express international deliveries only amount to an extremely reduced market despite the colossal income earned by some international delivery companies.

This finding is related to the fact that all current delivery logistics systems are based on an approach of centralized control, based in particular upon:
grouping of goods to be shipped;
bulk transport;
parcel consignment.

In addition, analysis of conventional practice leads to ascertaining that:
local mail delivery is limited to deliveries within relatively small geographical areas, even local areas (although the adopting of trade models whereby resources are made available to users by different players of conventional specialists tends towards the generation of new, major possibilities);
national deliveries (more or less monopolistic) which function perfectly with delivery times in the region of 24 hours, but by definition this market is limited to a single country;
international deliveries remain niche markets favourable to the development of companies specialized in international deliveries, with delivery times and costs that are at times incompatible even unacceptable.

At the present time, there are therefore implicit or explicit expectations in respect of the shipment and delivery of goods within shorter times than is currently the practice, at service costs that are not too high and even low-cost.

One manner in which to meet these expectations lies in a community and/or collaborative approach, whereby each one operates within a universe in which a large proportion of individuals together obtain multiple possibilities of movement.

With this approach it can therefore be envisaged to dispatch an object from a departure point by entrusting it to one of the individuals within a collaborative system and to have it sent to a destination point via this individual alone or via relay with one or more other individuals within the collaborative system.

Evidently, within said system it is mandatory to be able to control the integrity of the dispatched object, at predetermined phases of dispatch or at any instants of time thereof.

It is also important to be able to identify the individual in the community temporarily in charge of having responsibility for the package.

Additionally, it is also necessary to have real-time knowledge of the position of the object to be dispatched, so as to relate this position to its point of destination and/or to the individuals taking part in the collaborative system.

It is a particular objective of the invention to use an approach of collaborative logistics allowing control over the integrity of the dispatched object at predetermined phases of dispatch, even at any instants in time thereof.

A further objective of the invention is to provide said collaborative logistic approach which allows the declaring by an individual of acceptance and responsibility for an object to be dispatched, and the tracking of handover acceptances.

A further objective of the invention is to provide said collaborative logistic approach which is simple and practical to use for individuals participating therein.

A further objective of the invention is to provide said collaborative logistic approach which entails little or no restriction for the individuals taking part in the dispatching of objects, in particular with regard to management of electric recharging of the technical means paired with the objects to be delivered and relating to the spatiotemporal traceability of the objects.

An additional objective of the invention is to provide said object dispatching system which ensures rapid, low-cost service for the senders of these objects.

These objectives and others which will become apparent below are reached with the invention, the subject of which is a system for dispatching objects via individuals within a community, using:
packages intended to contain the objects and given at least one recognition code,
a computing platform including at least one computing application intended to be downloaded by the computing units held by the individuals of the community, and including at least one database relating to the packages listing the recognition codes of all packages;
characterized in that the system includes means to determine and detect a predetermined key step of package dispatch,
and in that the computing platform and/or computing units are parameterized to:
transmit a request for image capture sent to image sensor(s) at each predetermined key step of dispatch;
receive images, via the computing application, relating to said object(s) taken by the image sensor(s).

Therefore, with the invention, it is possible to check the integrity of the objects being dispatched by monitoring the outer appearance of the objects. A process is therefore obtained with a system of the invention which makes dispatch secure, ensuring reliable operation for users sending objects via the dispatching system of the invention.

According to one preferred solution, the predetermined key steps are selected from the following group:
- handover of a package from one individual to another;
- opening and/or closing of the package;
- request by an individual;
- request by an administrator of the platform.

It is noted that, in general, checking of the image of the object can be made at any time and in particular:
- on request (triggered by an authorized element in the chain: sender, deposit-holder, traveller, recipient, but also police, customs etc.),
- automatically by the system (e.g. at each opening, or each transfer with or without opening).

Checking of the image of an object can therefore be automatic and optionally programmable according to needs (position, impact detection, weight variation, regular intervals, various alerts, etc). Checking can be performed on each opening, before and/or after opening, the system possibly also giving an open authorization or, if it is ignored, by anticipation (e.g. using GPS locating of the transfer, before and after transfer).

The checking may be effected on demand, possibly without opening, by allpersons concerned and authorized.

According to one particular embodiment, the computing platform and/or computing units comprise a module for image comparison and are parameterized to:
- receive, via the computing application, at least two images relating to said object(s) and corresponding to at least two different instants of dispatch time;
- compare the two images;
- determine whether a predetermined abnormal level of variation between the two images is reached.

In other words, if it is considered by the system after comparison of two images of the object taken at different time intervals that there is little or no variation in the appearance thereof, it is considered that object integrity is maintained. On the other hand, if the system detects violation or overstepping of a predetermined threshold of difference between two images of the object taken at different time intervals, it is considered that object integrity has not been heeded and different possibilities of treatment are then able to be contemplated, in particular the transmission of an alert signal to one or more individuals involved in the system.

According to one advantageous solution, the computing platform is parameterized to receive a responsibility acceptance signal from the individual temporarily in charge of the package, via the computing application contained in the computing unit held by the individual, the platform being parameterized to transmit an image capture signal to the image sensor(s) after receiving a responsibility acceptance signal.

In this manner, the object dispatching system ensures traceability of handover (and responsibility) acceptances for the objects by the different persons taking part in the dispatch. Each transfer of an object from one individual to another is therefore accompanied by monitoring of the appearance of the object, thereby performing a check that transfer is in progress whilst the integrity of the object is heeded. The individual receiving the object is similarly assured that the object has not suffered any damage and that it can be accepted with the assurance that the object is intact.

According to one preferred solution, the image comparison modules are parameterized to carry out image subtraction between two images, with detection of a difference threshold after subtraction.

Preferably, the database relating to the packages, for each package, comprises timestamping of the images of said object(s) captured by the image sensing means.

Additional data on transit is thereby obtained whereby the integrity of the object is checked at different times of dispatch, with the possibility of compiling a record of the images taken of the object. Evidently, in particular in the case when a variation in the appearance of the object is considered to be abnormal, the timestamping of captured images allows identification of the time at which this finding was made, and therefore on and after which time the variation could have occurred by tracing back to the image corresponding to maintained integrity of the object.

According to another advantageous characteristic, each package is provided with a device to weigh the object or objects together with the packaging.

In this manner, it is possible to combine data on outer appearance with data on weight. This further secures checking on maintained object integrity, when the outer appearance may not have changed but the weight has varied.

In this case, the computing platform is advantageously parameterized to receive a responsibility acceptance signal from the individual temporarily in charge of the package, via the computing application contained in the computing unit held by said individual, and the platform is parameterized to transmit a weigh signal to the weighing device after receiving a responsibility acceptance signal.

According to another advantageous characteristic, each package is provided with at least one zip fastening means and at least one slider, and means to detect the position of said slider(s) along the zipper chain.

In this manner, it is possible to combine data on outer appearance, and optionally weight, with data on opening of the package. This further reinforces checking of the object during transit under secure conditions. There is always a possibility that a non-authorized person may interfere with the confidentiality of dispatch, even if such person does not interfere with the integrity of the object.

In this case, each package is advantageously provided with at least one flap intended to cover the zip fastening means and slider(s), the package comprising a cable integrated in an electrical circuit having means to detect an opened position of said flap.

Said characteristic contributes towards securing dispatch of the object, by further increasing possibilities to check the packaging in respect of opening thereof and attempts to access the content thereof by non-authorized persons.

The invention also concerns a method for tracking accepted responsibility for an object dispatched using a system such as previously described, characterized in that it comprises the steps of:
- activating the computing application authorizing exchange of data between the computing platform and a computing unit held by an individual;
- receiving, by the computing platform and via the computing application contained in computing units, at least two successive images of said object(s) and corresponding to two different instants of dispatch time;
- comparing the two successive images;
- determining whether an abnormal level of variation between the two images has been reached.

The invention also concerns a computer programme comprising instructions adapted for implementation of the steps of the method described in the foregoing, when said computer programme is executed by at least one processor.

The invention further concerns the computer-readable recording medium on which a computer programme is recorded comprising instructions to implement the steps of the method described above.

Additionally, as will become apparent in the remainder hereof, the invention proposes a system for dispatching objects via individuals of a community, using a spaciotemporal traceability system comprising a computing platform including at least one computing application intended to be downloaded into the portable computing units held by the individuals of the community, and comprising first wireless near-field communication means and geolocating means, characterized in that it comprises devices embedded in the packages intended to contain the objects, the embedded devices each having second wireless near-field communication means capable of communicating with the first wireless near-field communication means, and at least one processing computing module capable of cooperating with the second wireless near-field communication means to retrieve and process data provided by said second wireless near-field communication means, and in that the computing module comprises said computing application to authorize exchange of data between the computing module and the portable computing units, the computing application being parameterized to open a communication channel intended to enable the embedded devices to access and use the geolocating means of the computing units.

Therefore, with said system, a spatiotemporal traceability system is obtained for objects transiting within a collaborative object dispatching system via individuals of a community, without shifting responsibility for the proper functioning of the technical means paired with the dispatched object, particularly with regard to the electrical recharging of the technical means paired with the object to be dispatched to ensure the geolocating thereof.

Technical means with high electrical energy consumption such as geolocating means are not included in the technical means paired with the dispatched object. Only means with low electrical consumption are paired with the dispatched object.

As a result, it is possible to supply electricity to the technical means paired with the dispatched object via an ordinary battery, able to ensure self-powering over a long period.

In this aspect of the invention the embedded devices are so to speak grafted onto the portable units, and possibly successive units, throughout the mobility of the dispatched object via the wireless near-field communication means, and use the "intelligence" of the portable units, in particular in respect of the geolocating means integrated in the portable units.

The embedded devices can therefore travel long distances being fully self-sufficient electrically. In addition, they can be reused numerous times without having to be electrically recharged, being coupled to different successive objects to be dispatched.

Evidently, the possible multiple reuse of the embedded devices imparts obvious economic advantage to the traceability system, and optimized carbon footprint by preventing full or partial rapid obsolescence of the embedded devices.

Figure 2:
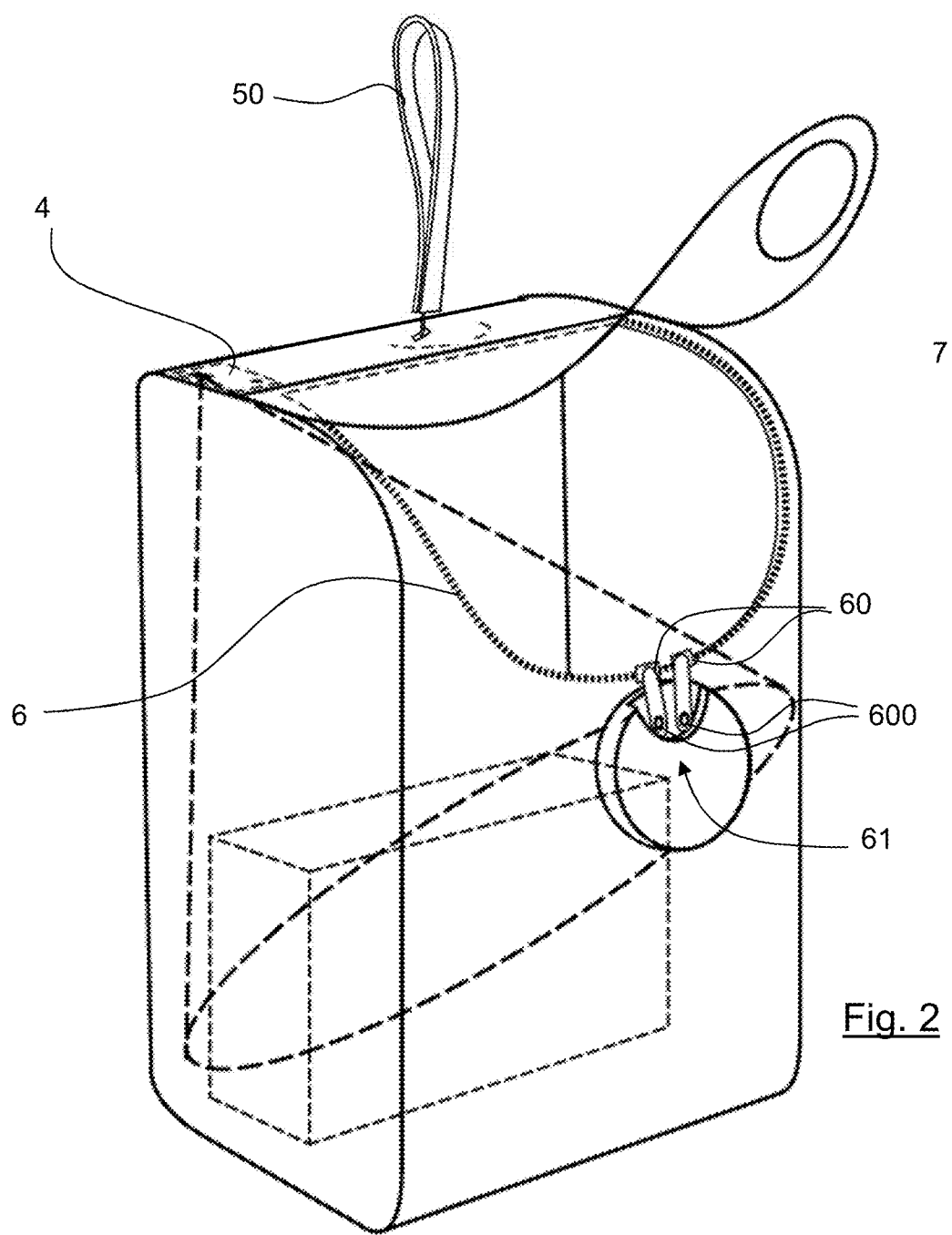
Figure 3:
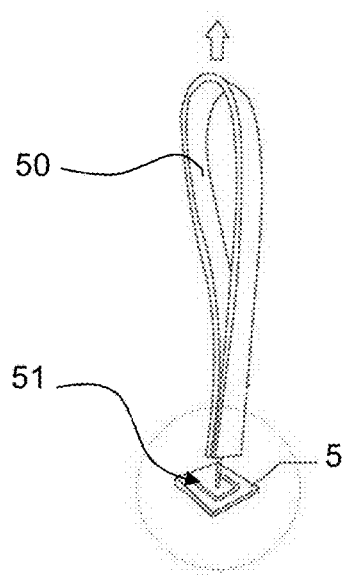
Figure 4:
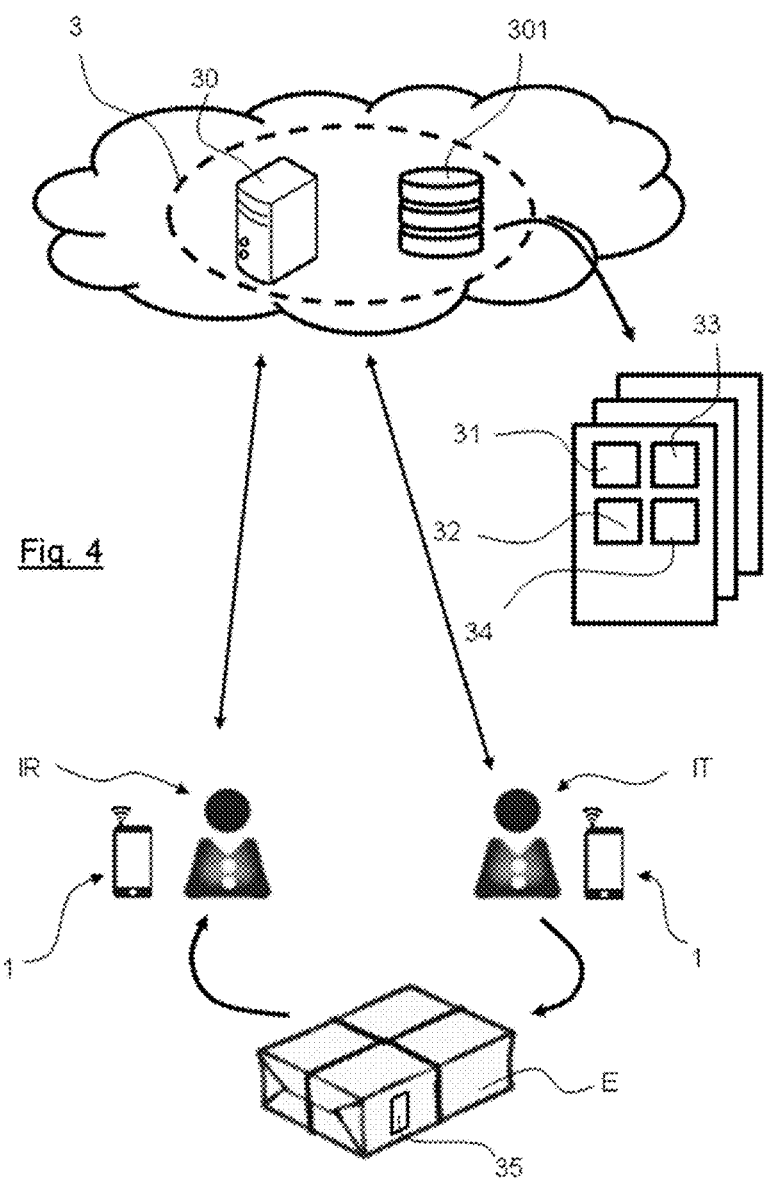
Figure 5:
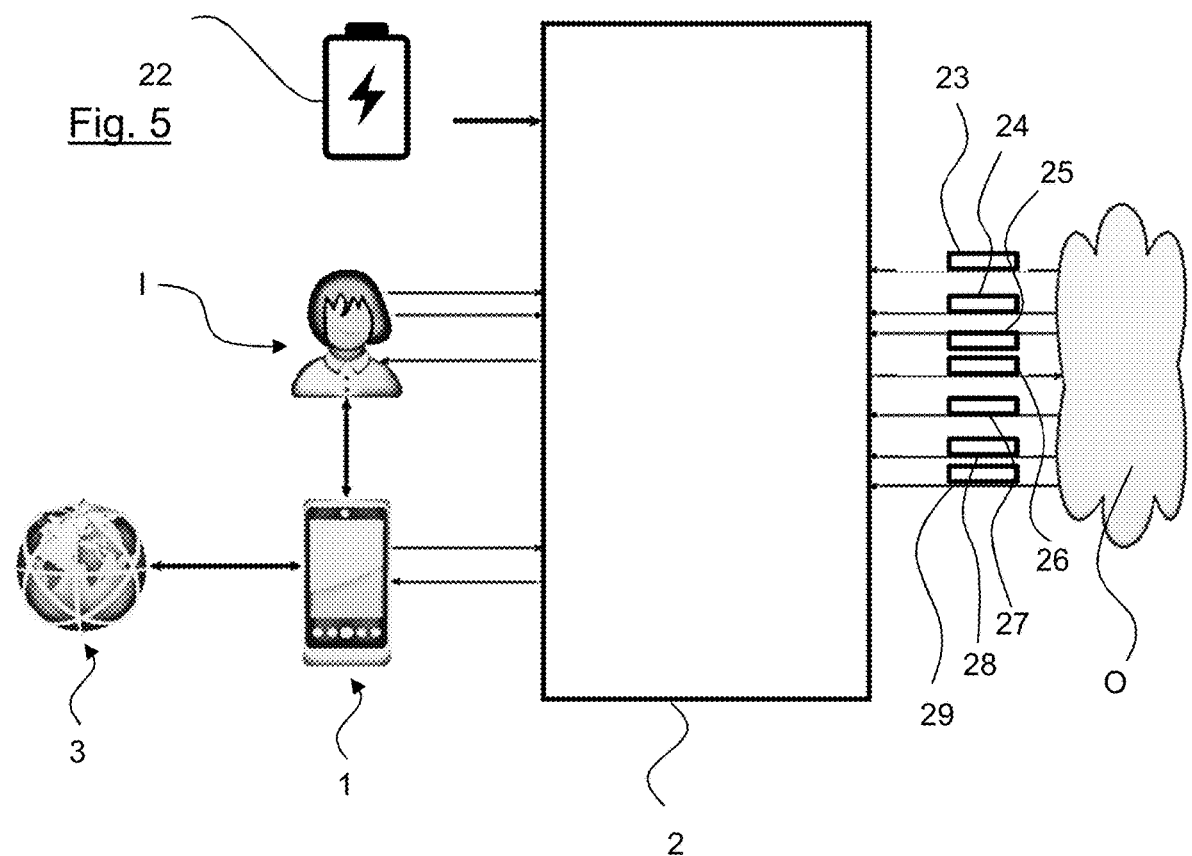
Figure 6:
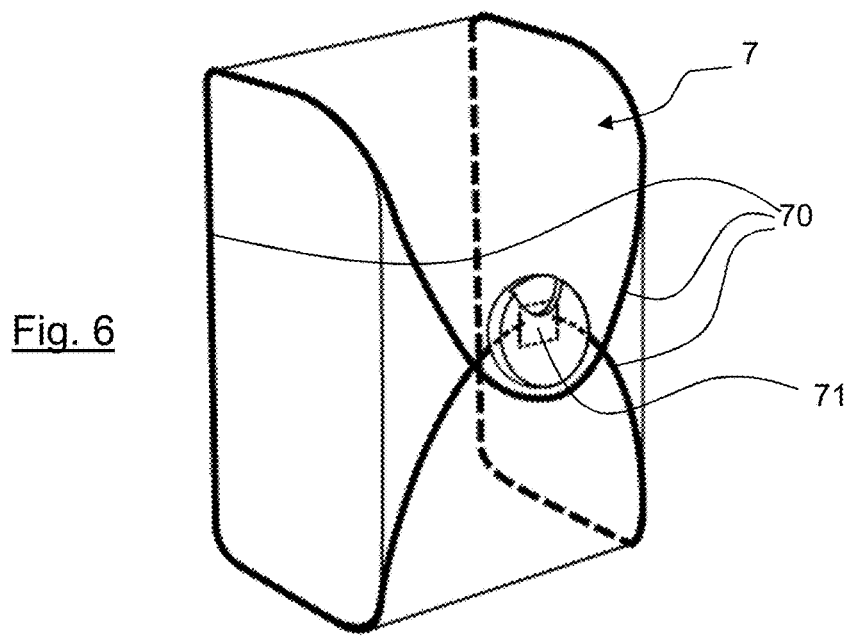

Other characteristics and advantages of the invention will become clearer on reading the following description of one preferred embodiment of the invention, given only as an illustrative nonlimiting example, and with reference to the appended drawings among which:

FIG. 1 schematically illustrates an object dispatching system according to the invention;

FIG. 2 schematically illustrates the presence of an image sensor in a package able to be used to dispatch an object in a system of the invention;

FIG. 3 schematically illustrates the package handle able to be used to dispatch an object in a system of the invention;

FIG. 4 schematically illustrates the process of the transfer of responsibility in an object dispatching system of the invention;

FIG. 5 gives a schematic illustration of a package able to be used to transport an object and the environment thereof in an object dispatching system of the invention;

FIG. 6 schematically illustrates one particular embodiment of a package able to be used to transport an object in a system of the invention, the package being provided with a flap and flap-opening detection cable.

As indicated in the foregoing, the principle of the invention is to propose an object dispatching system of collaborative type i.e. implemented by a group of individuals within a community.

Such as illustrated in FIGS. 1, 4 and 5, said system is of the type comprising:
computing units 1 held by individuals 1 of a community;
a computing platform 3 including a computing application intended to be downloaded into the portable computing units;
devices 2 embedded in packages E each given at least one recognition code 31 and intended to contain the objects O to be dispatched, these packages possibly being any container (envelope, parcel, packet.) of shape and size adapted to the object to be dispatched (the dimensions of the container and overall weight of the container added to the weight of the content preferably, but not exclusively, being adapted to the criteria defined for hand luggage by airline companies).

The computing platform 3 comprises a remotely-accessible server 30 and is parameterized to receive object dispatch data from a departure point to a destination point. The data entry mode for the departure point and destination point is described in more detail below.

According to the principle of the invention, each package is provided with at least one image sensor 4 for said object(s). With reference to FIG. 2, the image sensor(s) comprise:
a digital camera, mounted in one corner of the package (essentially of parallelepiped shape), inside the package, so as to obtain an overall view of the content of the package;
a flash (not illustrated) intended to be triggered simultaneously with the digital camera.

A battery 22 powers the embedded device, and for each image capture powers the digital camera and associated flash.

In addition, according to one particular preferred embodiment, the portable computing units are formed of smartphones of common widespread type and particularly comprise first wireless near-field communication means 10 and geolocating means 11.

According to one advantageous embodiment, the dispatching system uses an object traceability system comprising the computing platform 3, and particularly based on the use of embedded devices 2 comprising second wireless near-field communication means 20 capable of communicating with the first wireless near-field communication means 10. In addition, these embedded devices comprise at least one computing module 21 capable of cooperating with the second wireless near-field communication means 20 to retrieve and process data provided by these second communication means.

Evidently, the embedded devices may comprise many other structural and functional means mentioned below.

According to one preferred embodiment of the invention, the computing module 21 of the embedded devices and the computing units 1 comprise a computing application in common authorizing exchange of data between them. This computing application is parameterized to open a communication channel intended to allow access and use of the geolocating means 11 of the computing units by the computing module 21 of the embedded devices 2. In other words, the computing modules integrate the computing application, the latter possibly also being downloaded from the computing platform into the computing units held by the individuals in the community. Once the link is set up between the embedded device and the computing unit, the computing application (common to the embedded device and computing unit) opens a communication channel via the first and second wireless near-field communication means, and authorizes access and use by the embedded device of the geolocating means of the computing unit.

Therefore, as illustrated in FIGS. 1 and 4, the computing module of the embedded devices, as resources dedicated to traceability and hence geolocation, uses the resources of the portable computing units (in this case those of the smartphone held by the individual transporting the object), throughout the entire dispatch time ensured by the individual. Evidently, the traceability system also applies to the case when several individuals relay one another to transport the object, the embedded device then successively communicating with each portable computing unit of each individual.

As explained in more detailed below, the geolocating of the object can also be obtained via a portable computing unit held by a deposit-holder with whom the object is deposited, the object then possibly awaiting collection by a travelling individual.

According to one advantageous solution, the first wireless near-field communication means and the second wireless near-field communication means exchange data via Bluetooth (or WiFi according to another embodiment that can be envisaged).

The second wireless near-field communication means and the computing module of the embedded devices are powered by a simple non-rechargeable battery 22.

It is noted that the embedded devices could meet other structural and/or functional means powered periodically or continuously by the battery of the device, and in particular:
impact detection means 23;
temperature sensor 24;
humidity sensor 25;
illuminating means 26;
video capture means 27;
weight measuring means 28;
open/close detection means 29;

As can be seen in FIG. 1, the object dispatching system comprises a computing platform 3 managing the dispatching of objects, including first long-distance communication means intended to communicate with second long-distance communication means integrated in the portable computing units.

The server 30 of the computing platform also comprises means 300 for storing geolocation data transmitted to the computing platform by the portable units.

The traceability system of the objects to be dispatched is therefore not restricted to local storage of geolocating data, transmitted by the portable computing units, in the computing module of the embedded devices. On the contrary, in addition to the geolocation resources of the portable computing units used by the embedded devices, the latter also use the long-distance communication means of the portable computing units to exchange with the managing computing platform.

In addition, according to the principle of the invention, the computing platform 3 and/or computing units comprise an image comparison module 14 and are parameterized to:
receive, via the computing application, at least two images relating to said object(s) and corresponding to two different instants of dispatch time;
compare the two images;
determine whether an abnormal level of variation between the two images has been reached.

Triggering of the integrity check is operated as follows.

The system includes a module 40 to determine and detect a predetermined key step of package dispatch, the computing platform and/or computing units being parametrized to:
transmit an image capture request to the image sensor(s) 4 at each predetermined key dispatch step;
receive images, via the computing application 13, relating to said object(s) taken by the image sensor(s).

The predetermined key steps can be selected from the following group:
handover of a package from one individual to another;
opening and/or closing of the package;
request by an individual;
request by an administrator of the platform.

It is recalled that checking of the image relating to the object can be carried out at any time and in particular:
either on request (triggered by an authorized individual in the chain: sender, deposit-holders, traveller, recipient, but also police, customs etc.),
or automatically by the system (e.g. on each opening or each transfer with or without opening).

According to one particular approach, image capture is triggered by the platform parameterized to transmit an image capture signal to the image sensor(s) after receiving a responsibility acceptance signal, on the understanding that the computing platform 3 is parameterized to receive a responsibility acceptance signal from the individual temporarily in charge of the package E via the computing application contained in the computing unit held by the individual, as is described in more detail below.

Once the digital image taken by the sensor(s), the image is transmitted by the embedded device 2 via the second wireless near-field communication means 20 to the first wireless near-field communication means 10 of the computing units.

As previously indicated, the computing platform 3 includes first long-distance communication means intended to communicate with second long-distance communication means integrated in the portable computing units.

The images taken by the sensor(s) can be transferred from the embedded device to the computing platform via the computing units.

Image comparison is performed at the platform or portable units (in this case, the images are not transmitted immediately to the platform but are processed locally with transmission only of the result to the platform, an image of the object taken earlier having been previously transmitted by the platform to the computing unit in charge of comparison).

For this purpose, the received images are compared after they have been decompressed, these images being characterized by luminance and chrominance.

Using a technique known per se, the grey shades are differentiated (particularly entailing the extraction of luminance).

Bearing in mind that each pixel of an image is defied by its position and content, comparison is conducted pixel by pixel, the compared pixels possibly being only those in an "area of interest" with "counting" of the number of pixels which have varied.

The comparison module is also parameterized to determine whether an abnormal level of variation between the two images has been reached, with detection of a difference threshold after subtraction from images.

Upstream, the acquisition and processing of the image of the content is performed in the following manner:
- acquisition of successive bands of eight lines of pixels by a primary processing unit integrated in the embedded device of the package;
- compression of the bands as and when they are acquired, with indexing of the bands as and when they are stored in the primary processing unit;
- transmission of the bands, with their indexing, to a second processing unit once all the bands are processed or in real compression time;
- concatenation of the bands by the secondary processing unit to reconstitute the (compressed) image;
- transmission by the secondary processing unit of the compressed, reconstituted image to the computing platform via a BLE link ("Bluetooth Low Energy");
- receiving of the compressed, reconstituted image at the platform;
- comparison of images by the platform such as previously described.

A dedicated profile is created to transmit the image via BLE.

In addition, the database 301 relating to the packages, for each package, comprises timestamp data 34 of an image capture of said object(s) by the image sensor(s).

According to another characteristic that can be envisaged, each package is provided with a device to weigh the object(s) together with the package.

With reference to FIGS. 2 and 3, it is noted that according to a technique known per se measurement of the weight of the package with its object is obtained by measuring mechanical strain on a sensing element 5, operated by a stress gauge 51. When measuring weight, the package is held by the handle 50 and the entirety of the forces due to the weight of the object must be concentrated, via construction of the package, towards the sensing element 5 part of which is joined to the package and the other to the handle 50. The strain (in the region of a few μm) at the sensing element translates as variation in resistance at the stress gauge (four resistances mounted in a Wheatstone bridge) measured by the microcontroller Triggering of weight measurement is obtained as follows. The computing platform 3 is parameterized to receive a responsibility acceptance signal from an individual temporarily in charge of the package E, via the computing application contained in the computing unit held by the individual. Additionally, the platform is parameterized to transmit a weigh signal to the weighing device after receiving the responsibility acceptance signal.

Evidently, the weigh data is transmitted to the platform, again via the embedded device and then the computing unit of the individual (in similar manner as described for the transmission of images). A weight measurement will initially have been taken (i.e. at a preparatory phase of dispatch) and recorded in the database relating to the packages.

Weight measurement is performed on request transmitted by the platform either on each handover of responsibility or on request by the sender individual.

According to a further characteristic illustrated in FIG. 2, each package is provided with at least one zip fastening 6 and at least one slider 60 (in this case a pair of sliders 60). In addition, the packages each include means to detect the position of the sliders 60 along the zip chain 6.

According to the present embodiment, both sliders 60 mobile along the zip fastening are each equipped with a permanent magnet 600 to aid the final positioning of the slider (package closed) by positioning itself opposite a metal part. Underneath this metal part there is positioned a slider position detection device 61 formed of a Hall effect sensor allowing detection of the presence of the magnetic field generated by the permanent magnet 600 of the slider. As soon as the slider is no longer positioned in closed position, the Hall effect sensor detects the absence of this magnetic field and sends the information to the computing module of the embedded device. For the packet to be considered closed, both sliders must lie in closed position.

Evidently the information on detection of opening is transmitted to the platform, again via the embedded device and then via the computing unit of the individual (similar to the description given for transmission of images and/or weight measurement). Recording of opening/closing of the package will be carried out on request transmitted by the platform, or on each transfer of responsibility, or on request by the sender individual.

In addition, this information on detected opening can be used as trigger signal for image capture of the object contained in the package.

Also, the packages can be further secured by being provided with a flap 7 (FIGS. 2 and 6) intended to cover the zip fastening means 6 and slider(s) 60. In this case, the package may comprise additional means to detect whether the flap 7 has or has not been opened, the opening thereof being a first approach to accessing the zip fastening.

As illustrated in FIG. 6, the additional means to detect whether the flap 7 has or has not been opened is a cable 70 integrated in an electrical circuit including means to detect an opened position of the flap.

This cable 70 extends inside a sheath and travels continuously over the entire perimeter of the flap, returning to the front side of the package. Each end of the cable is connected to an electrical circuit 71 which allows detection of continuity or non-continuity of the circuit formed by the cable and hence violation of the integrity of the package and in particular flap integrity.

Additionally, this information on detected flap opening can be used as trigger signal for capture of an image of the object contained in the package.

It is noted that the cable 70 can be in steel for example to afford a protective function by preventing cutting thereof.

The server also hosts a first database 303 on "client" individuals and the objects to be dispatched, amongst which:
- an identification code of the individual;
- weight and size data characterizing an object to be dispatched;
- a departure date starting from a geolocated place;
- a delivery date starting from a geolocated place.

The server also hosts a second database 302 on "traveller" individuals of the community and their portable computing units, amongst which (aside from identity of the individuals):

an identification code of the individual;
a departure date of the individual;
a place of departure of the individual;
a date of arrival of the individual;
a place of arrival of the individual.

It is noted that each embedded device is identifiable by a numerical identification code, the server 30 hosting a database 301 on the packages, this database listing:

recognition codes 31 of the packages;
numerical identification codes 32 of each embedded device.

The server also hosts a third database 304 on "deposit-holders" of the community and their portable computing units and/or computer, and includes (aside from their identity):

an identification code of the individual;
their geographical position;
the number of available package(s) (with embedded device) in their possession.

The databases 302, 303 and 304 can be separate or grouped together within a global database. Each thereof is able to receive data by link with the computing applications dedicated to user profile, in this case the "traveller" computing application 305, the "client" computing application 306 and "deposit-holder" computing application 307.

Therefore, all individuals are able to identify themselves with the computing platform by transmitting their identification code via the computing application contained in the computing unit held by each one.

It is further noted that the computing platform comprises means for connection and communication with the user interfaces parameterized to transmit object dispatching requests to the computing platform.

In practice, these interfaces are formed of smartphones, or computers or tablet computers (for example for "deposit-holder" individuals of the community) which have downloaded a dedicated computing application.

According to one preferred embodiment of the invention, the dispatching system is implemented within a system of transfer of responsibility to target the ensured traceability of successive handovers of the packages equipped with the previously described embedded devices.

As previously indicated, this responsibility transfer system provides that the server of the computing platform of the system comprises a database including identification data and tracking of each embedded device, and a recognition code for each package. More specifically, the identification data may first comprise the Bluetooth number of the computing module and secondly a dispatch number defined by the server of the computing platform and allocated to the embedded device by pairing the Bluetooth number with the dispatch number. This allocation is performed in practice at the time the object is inserted in the package, the person performing this operation connecting to the server and linking the digital dispatch file (requested and recorded by the sender of the object) with a visual code (number or QR code or other) attached to the package (all packages and therefore all Bluetooth numbers with their corresponding visual codes being known to the server).

A "responsibility code" field 33, intended to identify the individual temporarily in charge of the package E, is also associated with each package in addition to the recognition code 31 and optionally the numerical identification code and tracking code of the embedded device 32.

In addition, the database relating to packages, for each package, comprises updated timestamp data 34 on the responsibility code.

Therefore, the responsibility transfer system is programmed to execute the following steps (by the server of the computing platform of the system):

associating, in the responsibility code field 33, the identity (provided by the identification code of the individual) of the person taking in charge the package (and the object contained therein) with the list of identification and tracking data of the embedded device in the package, with timestamping of this association;
sending, to a new person on the point of taking the package in charge, an acceptance request transmitted by the person on the point of handing over the package, via the platform of the system;
receiving the acceptance given by the person taking the package in charge;
modifying, in the responsibility code field 33, the identity of the person taking the package in charge (and the object contained therein) with timestamping of this modification.

It is noted that the steps just described assume that the two persons, the person handing over and the person taking over, have a connection to the server of the computing platform.

However, if one of the persons, even both persons, do not have a connection to the server, it could be envisaged to modify and provisionally store the modified information relating to the person in charge of the package, the information being transmitted to the server via the corresponding smartphone (or corresponding computer) as soon as connection is restored (even via the smartphone of a third party).

In general, it is therefore understood that the platform is parameterized to receive a responsibility acceptance signal from the individual temporarily in charge of the package via the computing application contained in the computing unit held by said individual, and consequently to modify the responsibility code associated with the recognition code of the package.

With reference to FIG. 4, the responsibility transfer process operates in the manner described below.

One individual (called transmitting individual IT) on the point of transferring an object (in its package E) to another individual (called receiving individual IR) activates the computing application on his/her computing unit 1 (smartphone or other) authorizing exchange of data between the computing platform 3 and said own unit.

Using the computing application, the transmitting individual IT sends a responsibility transfer request to the computing platform 3 (the platform being parameterized to receive this responsibility transfer request via the computing application contained in the transmitting individual's computing unit).

With the responsibility transfer request, the transmitting individual IT sends the identification code of the receiving individual IR (the computing platform being parameterized to receive and store the identification code of the receiving individual) to whom the transmitting individual IT is on the point of entrusting the object to be dispatched. This enables the computing platform 3 to transmit an acceptance request to the receiving individual via the computing application contained in the computing unit 1 held by the receiving individual IR.

In return, the receiving individual IR transmits an acceptance signal via the computing application contained in his/her computing unit, the platform being parameterized to receive an acceptance signal from the receiving individual via the computing application contained in the receiving individual's computing unit). The acceptance signal transmitted via the computing application contains the identification code of the receiving individual (the computing platform being computerized to receive the identification code of the receiving individual who transmitted the acceptance signal).

The responsibility code associated with the package is then updated with the identification code of the receiving individual (the computing platform being parameterized to update the responsibility code with the identification code of the receiving individual).

In addition, the computing platform records the hour and date of the acceptance signal in the timestamp data 34.

This process is evidently reproduced for each transfer of the package from one individual to another.

It is noted that by "update" of the responsibility code, it is optionally meant the updating of the log of responsibility codes successively recorded.

In this respect, the packages each comprise a computing register 35. In parallel, the computing platform is parameterized to update the computing register 35 of each package E with the successive responsibility codes and timestamp data related to transfers of responsibility. In this manner, a log of responsibility codes associated with the recognition code of a package is compiled.

The object dispatching process and interaction between the individuals in a dispatching system of the invention will now be described.

According to first dispatching example, an object is dispatched from one place of deposit to another place of deposit, the user of the service sending the object then proceeding to the first place of deposit to deposit the object to be dispatched and the recipient individual proceeding to the second place of deposit to collect the dispatched object.

With this process, the user having an object to be dispatched connects to the computing platform of the system to access the user interface to enter:
  a departure date, from a geolocated place (insofar as the user has knowledge of the closest place of deposit, otherwise the computing platform can define this place of deposit in relation to the user's geolocation e.g. as a function of the user's home or workplace);
  a delivery date and a geolocated place (possibly in the form of a destination address);
  the weight and/or size of the object;
  optionally means of payment.

As a function of the entered departure geolocation, the computing platform reserves a dispatch package provided with an embedded device such as previously described, and signals this reservation to the place of deposit. If no dispatch package is available at the defined place of deposit, the computing platform ensures a service to send a dispatch package to the defined place of deposit.

The user proceeds to the first place of deposit with the object to be dispatched. Via a dedicated computing application downloaded into the user's smartphone, the user transmits data relating to the object and dispatching thereof to the deposit-holder having the same computing application on a smartphone (or computer). With these identification data, the deposit-holder identifies the dispatch package allocated to the object to be dispatched (the computing platform of the service having chosen a specific numerical identification code of the embedded device integrated in the despatch package).

The deposit-holder places the object to be dispatched in the identified dispatch package. The user, via the dedicated application, validates delivery to the deposit-holder, the latter digitally accepting this handover and thereby becoming responsible for the object and dispatch package.

It is noted at this stage that the embedded device of the dispatch package starts to communicate via the wireless near-field communication means with the deposit-holder's smartphone to access the geolocating resources of this smartphone.

In parallel, a community of individuals report to the computing platform managing the system, and enter the following information in particular:
  a departure date;
  place of departure;
  date of arrival;
  place of arrival.

With the user data, and data on the individuals of the community and their travel, the server of the computing platform builds two databases, namely a database on the objects to be dispatched and a database on the portable units held by the individuals, with the travel data of the individuals.

The management system, in real time, compares the data on the dispatch package at the place of deposit and ready to be dispatched, with the database on individuals of the community and their travel. This comparison leads the computing platform to choose an individual based on closeness to the place of deposit for departure and closeness to a place of deposit on arrival. An alert is sent e.g. by SMS to the smartphone of the travelling individual indicating the time and place to collect the dispatch package containing the object to be dispatched.

At the departure place of deposit, the traveller discloses his/her identity with the deposit-holder via the computing application downloaded into his/her smartphone and transmits to the deposit-holder the identification of the dispatch package that he/she has just collected.

With the computing system, the deposit-holder validates handover of the dispatch package to the travelling individual, which leads to:
  disconnecting the deposit-holder's smartphone from the embedded device in the package;
  connecting the embedded device in the dispatch package to the smartphone of the travelling individual.

The travelling individual travels to the second place of deposit, namely the arrival place of deposit. Throughout the journey the embedded device in the dispatch package is permanently connected to the travelling individual's smartphone, ensuring tracking and geolocating of the dispatched object, these data able to be transmitted periodically to the computing platform for access by the user and sender.

At the arrival place of deposit, the travelling individual hands over the dispatch package to the deposit-holder, using the computing application to indicate to the deposit-holder the identification of the package and its dispatch, the latter validating via the computing application the taking in charge of the dispatch package, which leads to:
  disconnecting the embedded device of the dispatch package from the travelling individual's smartphone;
  connecting the embedded device of the dispatch package to the deposit-holder's smartphone.

Acceptance to take in charge the dispatch package by the arrival deposit-holder is signalled via computing to the computing platform managing the system, which sends an alert signal by SMS to the recipient user by transmitting the geolocating data of the arrival place of deposit.

The recipient individual proceeds to the place of deposit and discloses his/her identity with the deposit-holder, using the computing application previously downloaded into his/her smartphone.

The deposit-holder, via the computing application, checks the identity of the recipient individual and validates handover of the dispatch package to this individual, which leads to:

disconnecting the embedded device of the dispatch package from the deposit-holder's smartphone;
connecting the embedded device of the dispatch package to the smartphone of the recipient individual.

The recipient individual validates reception of the dispatch package via the computing application, this validation being transmitted to the computing platform managing the system which informs the sender user by SMS.

Evidently, the dispatching system from deposit-holder to deposit-holder just described can be enriched upstream and downstream, through the intervention of a travelling individual ensuring dispatching of the dispatch package between the sender individual and the departure place of deposit, and through the intervention of a travelling individual at the delivery end of dispatching able to ensure movement of the dispatch package from the arrival place of deposit to the recipient individual.

The invention claimed is:

1. System for dispatching objects via individuals of a community, comprising:
   packages intended to contain the objects, having dimensions and weights allowing a single person to carry the packages, and given at least one recognition code,
   portable computing units held by the individuals of the community; and
   a computing platform including at least one computing application intended to be downloaded by the computing units held by the individuals of the community, and including at least one database relating to the packages listing the recognition codes of all packages,
   wherein each package is provided with at least one image sensor for said object(s),
   wherein the system includes a module to determine and detect a predetermined key step in the dispatch of the package,
   wherein the computing platform and/or the computing units are parameterized to:
      transmit an image capture request to the image sensor at each predetermined key step of dispatch; and
      receive images, via the computing application, relating to said object(s) taken by the image sensor, and
   wherein the computing platform is parameterized to:
      receive responsibility acceptance signal from the individual temporarily in charge of the package via the computing application contained in the computing unit held by said individual; and
      transmit an image capture signal to the image sensor after receiving a responsibility acceptance signal.

2. The system according to claim 1, wherein the predetermined key steps are selected from the following group:
   handover of a package from one individual to another;
   opening and/or closing of the package;
   request by an authorized individual;
   request by an administrator of the platform.

3. The system according to claim 1, wherein the computing platform and/or the computing units comprise an image comparison module and are parameterized to:
   receive, via the computing application, at least two images relating to said object(s) and corresponding to at least two different instants of dispatch time;
   compare the two images; and
   determine whether a predetermined abnormal level of variation between the two images has been reached.

4. The system according to claim 3, wherein the image comparison module is parameterized to carry out image subtraction between two images, with detection of a difference threshold after subtraction.

5. The system according to claim 1, wherein the database relating to the packages, for each package, comprises timestamp data of an image capture of said object(s) by the image sensor.

6. The system according to claim 1, wherein each package is provided with a device to weigh the object(s) together with the package.

7. The system according to claim 6, wherein the computing platform is parameterized to receive a responsibility acceptance signal from the individual temporarily in charge of the package, via the computing application contained in the computing unit held by said individual, and in that the platform is parameterized to transmit a weigh signal to the weighing device after receiving a responsibility acceptance signal.

8. The system according to claim 1, wherein each package is provided with at least one zip fastening and at least one slider and with a device to detect the position of said slider(s) along the zip chain.

9. The system according to claim 8, wherein each package is provided with at least one flap intended to cover the zip fastening and slider(s), the package comprising a cable integrated in an electrical circuit including a device to detect an opened position of the flap.

10. Method for tracking accepted responsibility for an object dispatched using a system according to claim 1, characterized in that it wherein the method comprises the steps of:
    activating the computing application authorizing exchange of data between the computing platform and a computing unit held by an individual;
    receiving, by the computing platform and via the computing application contained in computing units, at least two successive images of said object(s) and corresponding to two different instants of dispatch time;
    comparing the two successive images; and
    determining whether an abnormal level of variation between the two images has been reached.

11. Computer programme comprising instructions adapted to implement the steps of the method according to claim 10, when said computer programme is executed by at least one processor.

12. Computer-readable recording medium on which a computer program is recorded comprising instructions to implement the steps of the method according to claim 10.

* * * * *